United States Patent
Itakura

(10) Patent No.: US 8,509,599 B2
(45) Date of Patent: Aug. 13, 2013

(54) RECORDING AND REPRODUCING APPARATUS, RECORDING AND REPRODUCING METHOD AND PROGRAM

(75) Inventor: Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/495,836

(22) Filed: Jul. 1, 2009

(65) Prior Publication Data
US 2010/0003007 A1    Jan. 7, 2010

(30) Foreign Application Priority Data

Jul. 3, 2008   (JP) ............................... P2008-174975

(51) Int. Cl.
*H04N 9/80*    (2006.01)

(52) U.S. Cl.
USPC .......................................... 386/250

(58) Field of Classification Search
USPC ................. 386/239, 248, 249, 250, 251, 343, 386/241
See application file for complete search history.

(56) References Cited

U.S. PATENT DOCUMENTS

| | | | | |
|---|---|---|---|---|
| 5,909,421 A * | 6/1999 | Yatomi | ............................ | 369/84 |
| 8,321,466 B2 * | 11/2012 | Black et al. | .................. | 707/802 |
| 2004/0005143 A1 * | 1/2004 | Tsuru et al. | ...................... | 386/95 |
| 2004/0133909 A1 * | 7/2004 | Ma | ................... | 725/34 |
| 2005/0002644 A1 * | 1/2005 | Nakamura et al. | ............... | 386/52 |
| 2005/0012859 A1 * | 1/2005 | Adolph et al. | ................. | 348/473 |
| 2006/0013554 A1 * | 1/2006 | Poslinski | ......................... | 386/46 |
| 2006/0070095 A1 | 3/2006 | Newton et al. | | |
| 2007/0230905 A1 * | 10/2007 | Kato et al. | ....................... | 386/94 |

FOREIGN PATENT DOCUMENTS

| | | |
|---|---|---|
| JP | 2001 275079 | 10/2001 |
| JP | 2002 369162 | 12/2002 |
| JP | 2006 510250 | 3/2006 |
| JP | 2007 66409 | 3/2007 |
| JP | 2007-266677 | 10/2007 |
| JP | 4039244 | 11/2007 |

* cited by examiner

*Primary Examiner* — Tat Chio
(74) *Attorney, Agent, or Firm* — Frommer Lawrence & Haug LLP; William S. Frommer

(57) ABSTRACT

There is provided a recording and reproducing apparatus comprising, an extracting unit that extracts program data containing commercial message sections and main sections from a video signal, a recording unit that records the program data extracted by the extracting unit, an analyzing unit that analyzes the program data to identify the commercial message sections and the main sections and generates clip attribute information for the identified commercial message sections, a data processing unit that adds skip information indicating that skipping is requested to the clip attribute information based on a skip request signal input by a viewer; and a reproduction control unit that controls the reproduction of the commercial message sections depending on the skip information when reproducing the program data recorded in the recording unit.

10 Claims, 8 Drawing Sheets

RECORDING AND REPRODUCING APPARATUS, RECORDING AND REPRODUCING METHOD AND PROGRAM

BACKGROUND OF THE INVENTION

1. Field of the Invention

The present invention relates to a recording and reproducing apparatus, a recording and reproducing method and a program.

2. Description of the Related Art

In recent years, a viewing style in which a viewer firstly records a TV program being broadcasted into a recording medium such as hard disc, DVD or BD (Blu-ray Disc: trademark) and views it later is getting popular. In such a viewing style, reproduction of commercial messages (called as CM below) inserted into the videos of the program may be skipped by a viewer.

When a reproduction of a CM is skipped, a loss resulting from a reduction of advertising impact is an issue for sponsors which have provided the CM aiming for an advertising impact on viewers of the CM.

In Japanese Patent No. 4039244, a technique in which CMs are recorded in a dedicated area provided in a recording medium in order to reflect the intentions of the sponsors on recording CMs into the recording medium is proposed. Further, in US Patent No. 20060070095, there is disclosed a reproducing apparatus which forces viewers to view CMs. Furthermore, in Japanese Patent Application Laid-Open No. 2007-266677, there is disclosed a technique in which a list of videos to be reproduced is edited based on a viewer's viewed history.

SUMMARY OF THE INVENTION

However, the method described in Japanese Patent No. 4039244 or US Patent No. 20060070095 emphasizes that sponsors' requests are met, and forces viewers to view CMs, which lost a balance with viewers' needs. Further, in the method described in Japanese Patent Application Laid-Open No. 2007-266677, since the viewer can freely select a playlist to be reproduced, the viewer can firstly reproduce only CMs before watching a main content and skip watching all the CMs practically.

The viewers may wish to view a CM at least once. If a user's at least one time viewing of the CM is ensured, there is a merit for a sponsor providing the CM. Based on this viewpoint, it is desirable to establish a new form of providing CMs while keeping the merits for both viewers and sponsors effectively.

The present invention has been made in views of the above issues, and it is desirable to provide a novel and improved recording and reproducing apparatus, recording and reproducing method and program for ensuring user's viewing of CMs at least once.

According to an embodiment of the present invention, there is provided a recording and reproducing apparatus comprising: an extracting unit that extracts program data containing commercial message sections and main sections from a video signal; a recording unit that records the program data extracted by the extracting unit; an analyzing unit that analyzes the program data to identify the commercial message sections and the main sections and generates clip attribute information for the identified commercial message sections; a data processing unit that adds skip information indicating that skipping is requested to the clip attribute information based on a skip request signal input by a viewer; and a reproduction control unit that controls the reproduction of the commercial message sections depending on the skip information when reproducing the program data recorded in the recording unit.

With the above configuration, the extracting unit extracts program data containing CM sections and main sections from a video signal, and the recording unit records the extracted program data therein. The analyzing unit analyzes the program data to identify the CM sections and the main sections and generates clip attribute information for the identified CM sections. Further, the data processing unit adds skip information indicating that skipping is requested to the clip attribute information based on a skip request signal input by a viewer. The reproduction control unit controls the reproduction of the CM section depending on the skip information when reproducing the program data.

The reproduction control unit may skip a reproduction of a commercial message section for which the skip information indicates that skipping is requested.

Further, the data processing unit may add a viewing counter indicating the number of times that a viewer viewed each commercial message section, and the reproduction control unit skips a reproduction of a commercial message section of which the viewing counter exceeds a predetermined threshold value depending on the skip information.

The reproduction control unit may not skip the reproduction of a commercial message section being reproduced when a skip request signal is input.

The data processing unit may determine that the commercial message section being reproduced by the reproduction control unit when a skip request signal is input is a commercial message section requested to be skipped.

The analyzing unit may determine whether a content of an arbitrary commercial message section contained in the program data is repeated one of a content of other commercial message section recorded by the recording unit, and causes the recording unit to omit the recording of the commercial message section determined to be repeated one.

The analyzing unit may add reference information for referring to the other commercial message section repeated by the commercial message section whose recording is omitted by the recording unit to the clip attribute information.

The reproduction control unit may use the reference information to read and reproduce a content of a commercial message section when the recording of the commercial message section to be read has been omitted by the recording unit.

According to another embodiment of the present invention, there is provided a recording and reproducing method comprising the steps of: extracting program data containing commercial message sections and main sections from a video signal; recording the extracted program data therein; analyzing the program data to identify the commercial message sections and the main sections; generating clip attribute information for the identified commercial message sections; adding skip information indicting that skipping is requested to the clip attribute information based on a skip request signal input by a viewer; and controlling the reproduction of the commercial message sections depending on the skip information when reproducing the program data.

According to another embodiment of the present invention, there is provided a program for causing a computer controlling a recording and reproducing apparatus to function as: an extracting unit that extracts program data containing commercial message sections and main sections from a video signal; a recording unit that records the program data extracted by the extracting unit; an analyzing unit that analyzes the program data to identify the commercial message sections and the main sections and generates clip attribute information for the identified commercial message sections; a data processing unit that adds skip information indicating that skipping is requested to the clip attribute information based on a skip request signal input by a viewer; and a reproduction control unit that controls the reproduction of the commercial message sections depending on the skip information when reproducing the program data recorded in the recording unit.

As described above, it is possible to ensure a user's at least one time viewing of a CM according to the recording and reproducing apparatus, recording and reproducing method and program of the present invention.

DETAILED DESCRIPTION OF THE PREFERRED EMBODIMENTS

Figure 1:
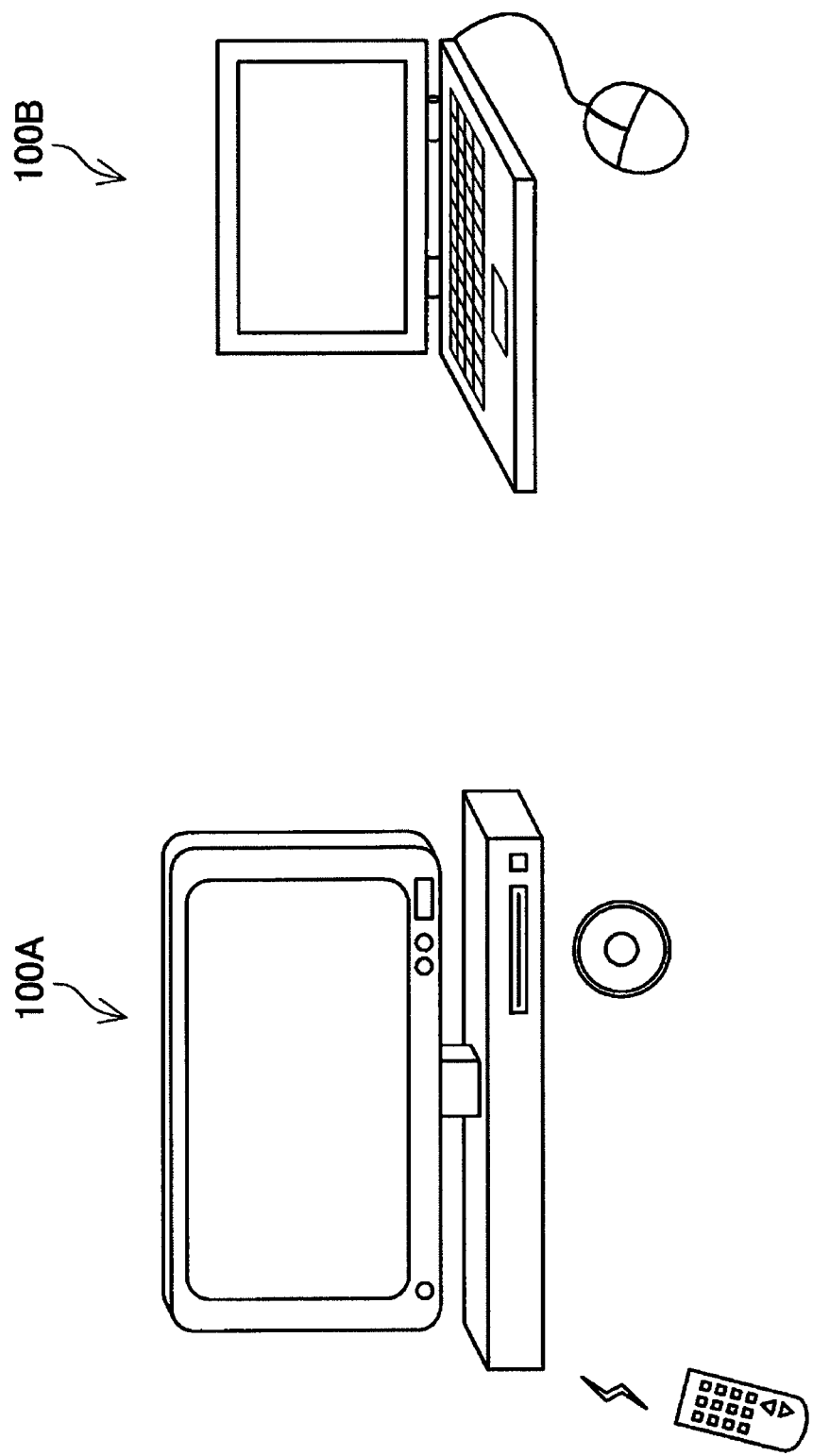
FIG. 1 is a schematic diagram showing a recording and reproducing apparatus according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments will be described in the following order:
[1] Outline of a recording and reproducing apparatus according to an embodiment
[2] Functions of a recording and reproducing apparatus according to an embodiment
[3] Example of a flow of recording processing
[4] Example of a flow of reproducing processing
[5] At the end
[1] Outline of a Recording and Reproducing Apparatus According to an Embodiment An outline of a recording and reproducing apparatus 100 according to an embodiment of the present invention will be first described with reference to FIGS. 1 and 2.

FIG. 1 is a schematic diagram schematically showing the recording and reproducing apparatus 100 according to an embodiment of the present invention. With reference to FIG. 1, a television receiver 100A is shown as an example of the recording and reproducing apparatus 100. Further, a personal computer (referred to as PC below) 100B is shown as another example of the recording and reproducing apparatus 100.

The recording and reproducing apparatus 100 typically has a function to record and reproduce a TV program of analog broadcast or digital broadcast programs. The recording and reproducing apparatus 100 is provided with an input device for accepting viewer's operations such as a remote controller or a mouse and a keyboard.

The recording and reproducing apparatus 100 is not limited to the television receiver 100A or the PC 100B shown in FIG. 1. The recording and reproducing apparatus 100 may be a recording device, which is configured separately from a display device, such as hard disc recorder or BD recorder, a electrical home appliance, a communication device such as cell phone, or a game terminal having a video receiving function.

Figure 2:
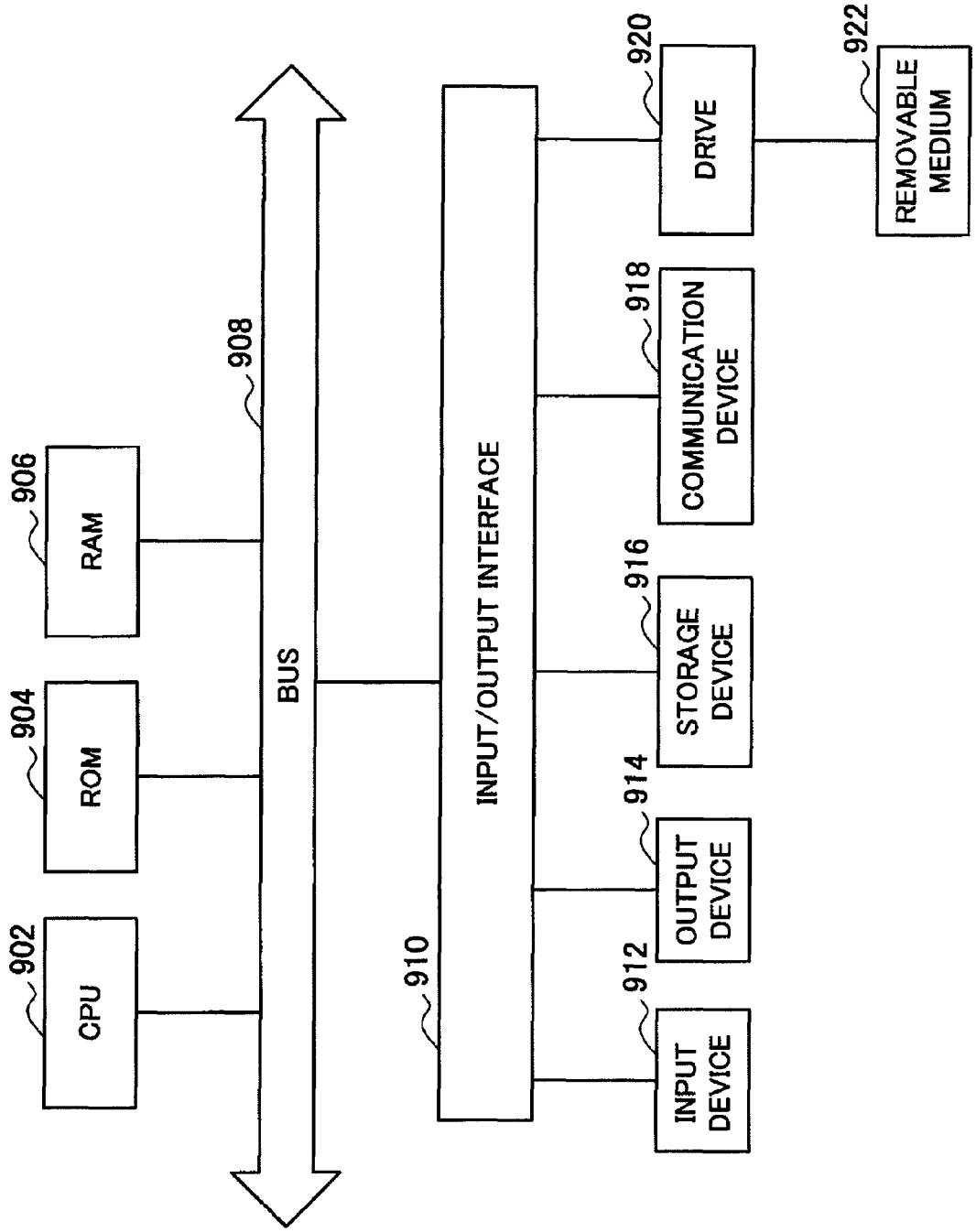
FIG. 2 is a block diagram showing a hardware configuration of the recording and reproducing apparatus according to an embodiment.

FIG. 2 is a block diagram showing an example of a hardware configuration when the PC 100B is used for implementing the recording and reproducing apparatus 100.

In FIG. 2, a CPU (Central Processing Unit) 902 controls the entire operation of the recording and reproducing apparatus 100. A ROM (Read Only Memory) 904 stores therein programs or data describing part of or all of a series of processing. A RAM (Random Access Memory) 906 temporarily stores therein programs or data used in the processing by the CPU 902.

The CPU 902, the ROM 904 and the RAM 906 are interconnected via a bus 908. Further, an input/output interface 910 is connected to the bus 908.

The input/output interface 910 is an interface for connecting the CPU 902, the ROM 904, the RAM 906 and an input device 912, an output device 914, a storage device 916, a communication device 918, a drive 920.

The input device 912 includes, for example, a mouse or a keyboard, buttons, switches or a remote controller and accepts user's operations. The output device 914 includes a display device such as CRT (Cathode Ray Tube), liquid crystal display or OLED (Organic Light Emitting Diode) and a sound output device such as speaker.

The storage device 916 includes, for example, a hard disc drive or flash memory and stores video data or programs therein. The communication device 918 performs a communication processing via a network such as Internet or performs a reception processing for a TV broadcast. The drive 920 is provided in the recording and reproducing apparatus 100 as needed. The drive 920 is mounted with a removable medium 922 which is a medium such as DVD or BD.

When a series of processing described later as an embodiment is performed in software, the programs stored in, for example, the ROM 904, the storage device 916 or the removable medium 922 shown in FIG. 2 are read into the RAM 906 and executed by the CPU 902.

The outline of the recording and reproducing apparatus 100 according to an embodiment has been described so far. Next, the functions of the recording and reproducing apparatus 100 will be described below with reference to FIGS. 3 to 6 in detail.

Figure 3:
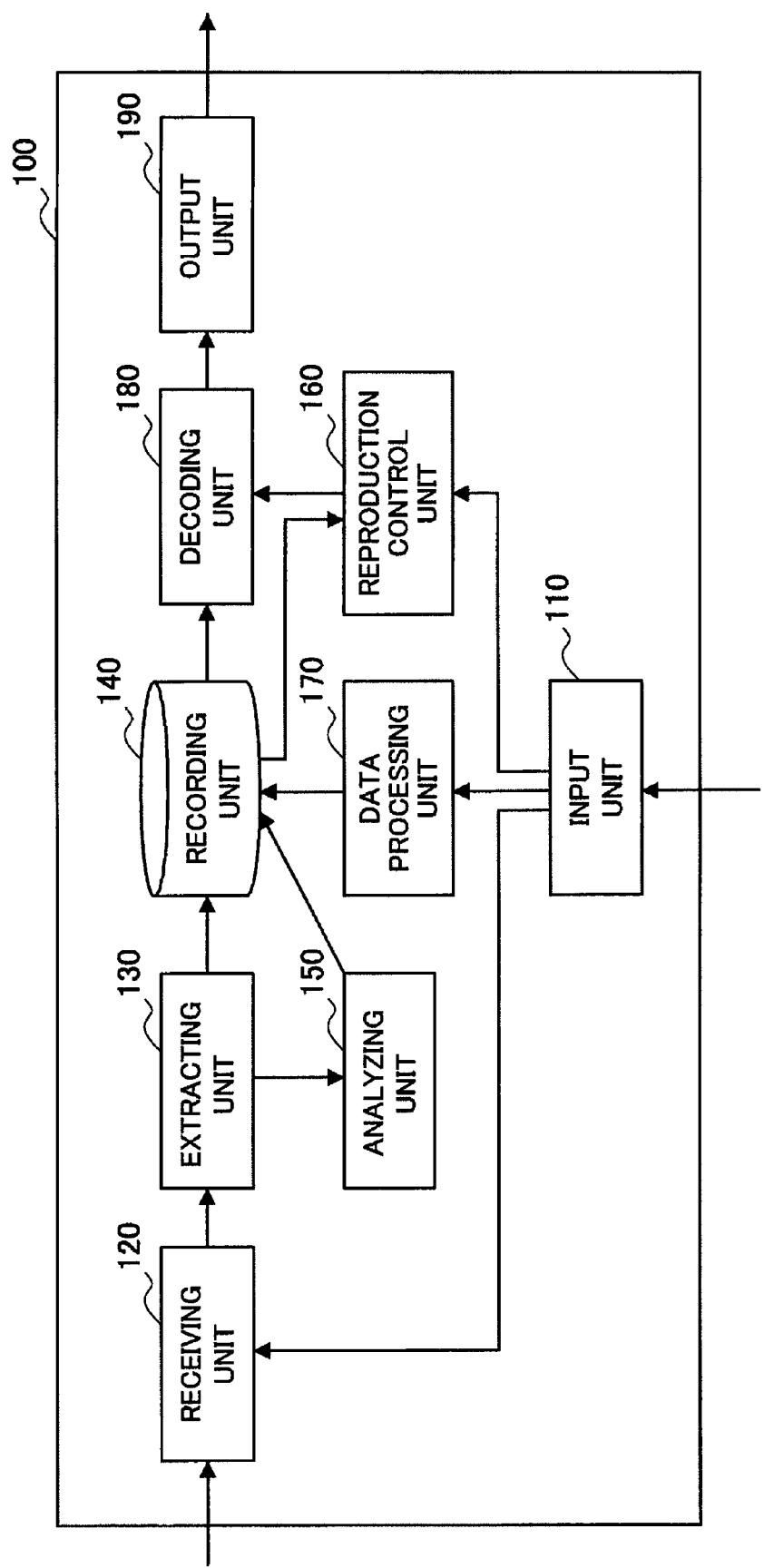
FIG. 3 is a block diagram showing a logical configuration of the recording and reproducing apparatus according to an embodiment.

[2] Functions of a Recording and Reproducing Apparatus According to an Embodiment FIG. 3 is a block diagram showing an example of a logical functional configuration of the recording and reproducing apparatus 100.

With reference to FIG. 3, the recording and reproducing apparatus 100 includes an input unit 110, a receiving unit 120, an extracting unit 130, a recording unit 140, an analyzing unit 150, a reproduction control unit 160, a data processing unit 170, a decoding unit 180 and an output unit 190.

The input unit 110 outputs a signal in response to an instruction from a viewer using the input device 912 shown in FIG. 2, for example, for the receiving unit 120, the reproduction control unit 160 or the data processing unit 170. For example, the input unit 110 outputs a signal for requesting to start reproduction to the reproduction control unit 160 when an operation for requesting to start reproduction of program data is performed by the viewer. Further, for example, the input unit 110 generates a skip request signal and outputs it to the data processing unit 170 when an operation for requesting to skip CMs is performed by the viewer.

The receiving unit 120 uses the communication device 918 shown in FIG. 2 to receive a video signal as stream signal which is broadcasted through radio wave or distributed via a network. The video signal received by the receiving unit 120 is output to the extracting unit 130.

The extracting unit 130 extracts a single program data from the video signal received by the receiving unit 120. The program data is typically divided into main sections which are essential constituents of the video and CM sections which present advertisement information mainly provided by sponsors. One unit of the video which may be classified into a main section or a CM section is called "a clip". The extracting unit 130 extracts a single program data containing such CM sections and main sections and outputs it to the recording unit 140 and the analyzing unit 150.

Figure 4:
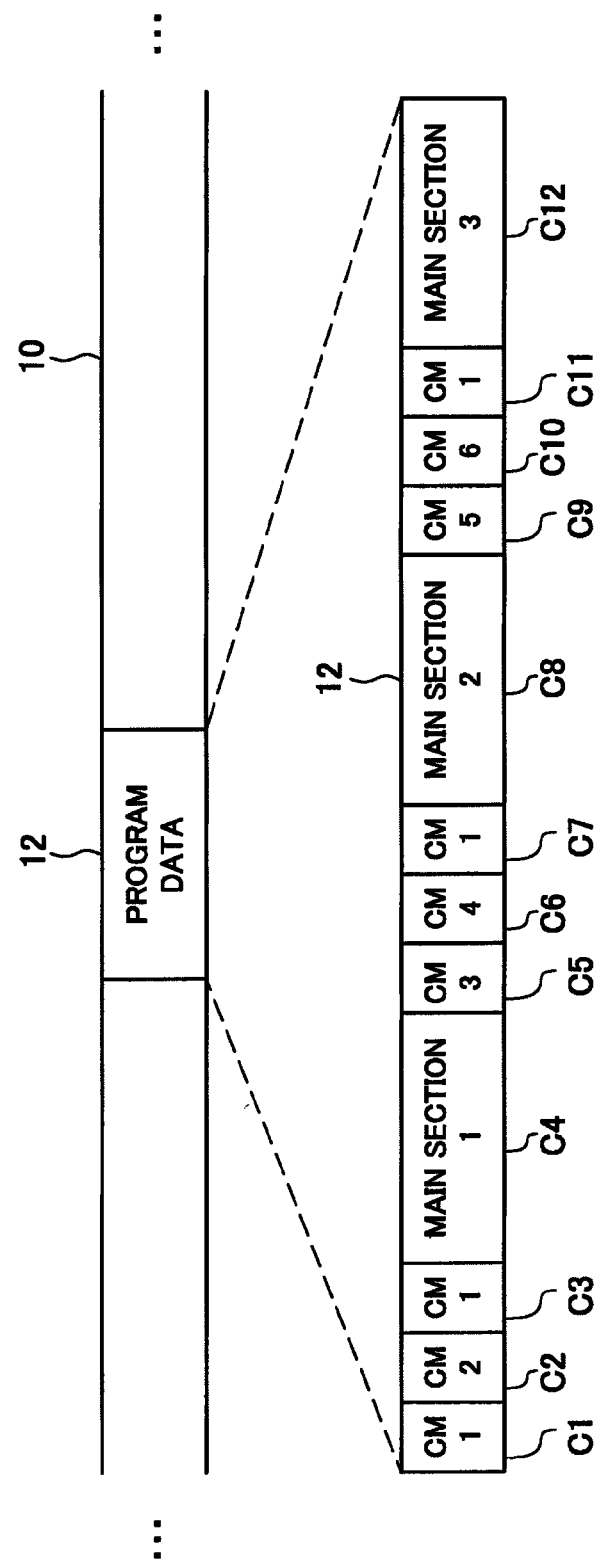
FIG. 4 is an explanatory diagram showing an example of program data recorded in a recording unit.

FIG. 4 is an explanatory diagram showing an example of a configuration of program data 12 containing CM sections and main sections. The upper part of FIG. 4 shows that the program data 12 is part of the video signal 10 received by the receiving unit 120.

Meanwhile, with reference to the lower part of FIG. 4, the program data 12 contains, for example, twelve items of clip data C1 through C12. In the present specification, the "clip data" each designates a portion corresponding to each individual clip among the program data which is an encoded video data.

In FIG. 4, C4, C8 and C12 represent the main sections of the program among the 12 items of clip data C1 to C12. The clip data C1 to C3, C5 to C7 and C9 to C11 represent the CM sections inserted before or after each main section.

Herein, each clip data as a CM section in FIG. 4 is denoted with symbols CM1 to CM6 representing the contents of the video. The meaning of the symbols will be described later.

Returning to FIG. 3, the description of the functions of the recording and reproducing apparatus 100 according to the present embodiment will be continued.

When program data is output from the extracting unit 130, the recording unit 140 records the program data in, for example, the storage device 916 shown in FIG. 2. When clip attribute information described later is output from the analyzing unit 150, the recording unit 140 records the clip attribute information in association with the program data. Further, when the recorded program data is requested to be reproduced, the recording unit 140 reads out the program data requested to be reproduced and the corresponding clip attribute information from the storage device 916 and outputs them to the reproduction control unit 160 or the decoding unit 180.

When the program data is output from the extracting unit 130, the analyzing unit 150 first analyzes the program data and then identifies the CM sections and the main sections described above.

For example, the analyzing unit 150 can detect the switching of the sound multiplex system in the analog broadcast to identify whether a portion of certain program data corresponds to a main section or a CM section. When the CM sections are successive, it is possible to determine that a time point of a scene change every 15 seconds or 30 seconds is a delimiter of CM sections. When a delimiter of the CM section is not detected, a plurality of CM sections may be identified as one clip. When an attribute value for identifying main sections and CM sections is contained in the data packet of digital broadcast, for example, the analyzing unit 150 may identify the main sections and the CM sections based on the attribute value.

The analyzing unit 150 generates clip attribute information for each identified clip after identifying the main sections and the CM sections contained in the program data as individual clips.

Figure 5:
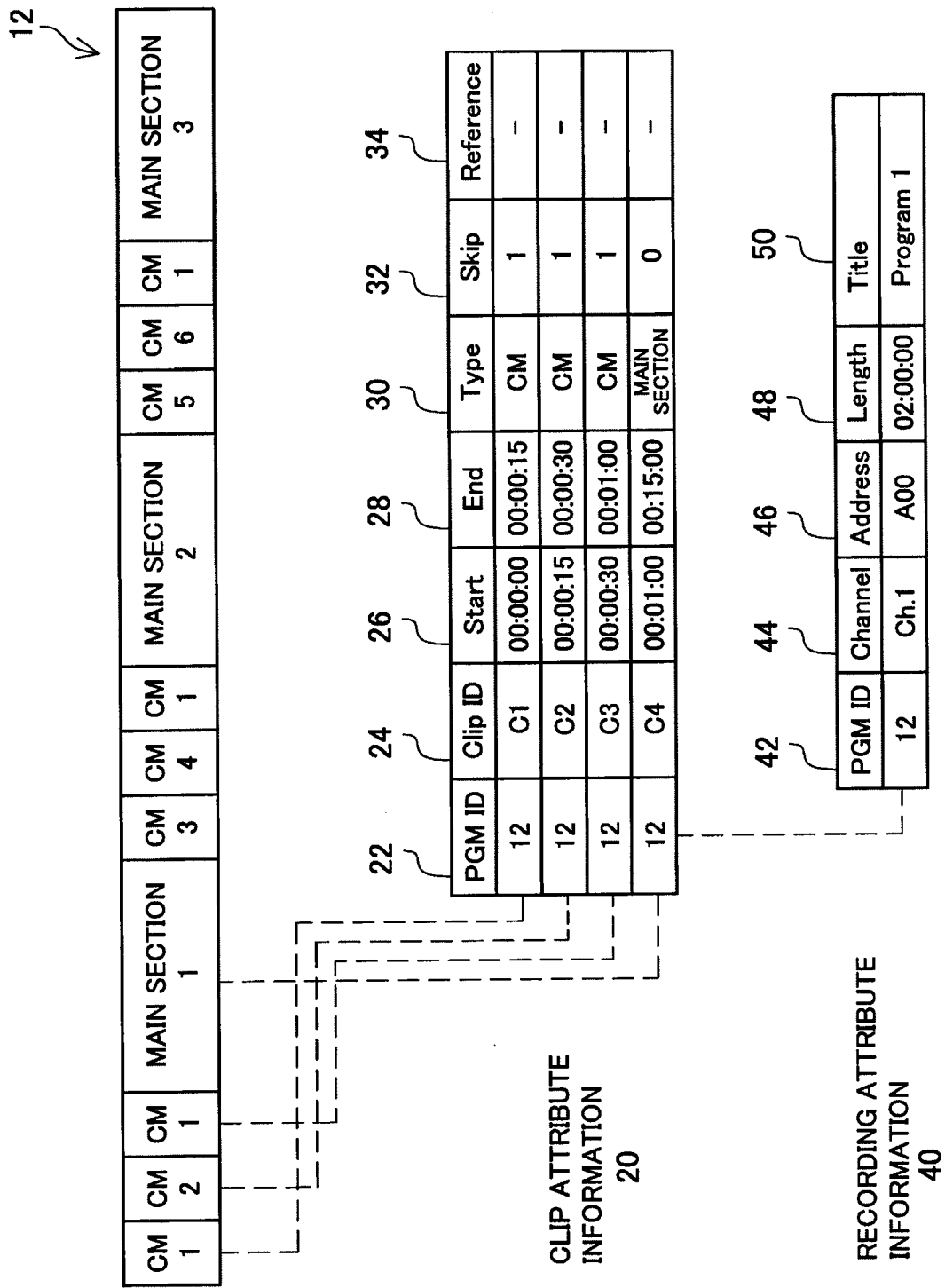
FIG. 5 is an explanatory diagram showing an example of clip attribute information recorded in the recording unit.

FIG. 5 is an explanatory diagram showing an example of the clip attribute information generated by the analyzing unit 150. With reference to FIG. 5, clip attribute information 20 for each clip and recording attribute information 40 associated with the clip attribute information 20 are shown along with the configuration of the program data 12 shown in FIG. 4.

In the example of FIG. 5, the clip attribute information 20 contains a program ID (IDentifier) 22, a clip ID 24, a start position 26, an end position 28, a clip type 30, skip information 32 and reference information 34.

The program ID 22 is an identifier identifying to which program data each clip belongs. It is indicated that all the program IDs of the clip attribute information 20 shown in FIG. 5 are "12" and all the clips belong to the program data 12.

The clip ID 24 is an identifier identifying individual clips. FIG. 5 shows the clip attribute information 20 relating to four clips having the clip IDs=C1 to C4 as an example.

The start position 26 is information indicating from which position in the program data 12 the clip data starts. Similarly, the end position 28 is information indicating at which position in the program data 12 the clip data ends. The start position 26 and the end position 28 may be time from the start time point of the program data as shown in FIG. 5, or may be address information within a recording medium in which the clip data is recorded.

The clip type 30 is information for identifying whether each clip is a main section or a CM section. A value of the clip type 30 is determined depending on the above identification result by the analyzing unit 150. In the example of FIG. 5, it is understood from the value of the clip type 30 that the clips C1 to C3 belong to CM sections and the clip 4 belongs to main sections.

The skip information 32 is information for determining whether to skip the reproduction of the clip when reproducing the program data 12. The skip information 32 employs a logical value indicating whether it is requested to skip the clip, for example.

The reference information 34 stores therein information indicating a reference destination of the clip data of the repeated other CM section when repetition of a content of a CM sections is detected.

Meanwhile, FIG. 5 also shows an example of the recording attribute information 40. The recording attribute information 40 contains a program ID 42, a channel 44, an address 46, a length 48 and a title 50, for example.

The program ID 42 stores therein an identifier for uniquely identifying the program data 12 as a single recorded video data. A value of the program ID 42 is used, for example, to associate the above clip attribute information 20 with the recording attribute information 40.

The channel 44 stores therein an identifier of a channel used for receiving the program data. The address 46 stores therein an address on a recording medium in which the reproduction of the program data 12 has to be started. Further, for example, the length 48 stores therein a total time required for reproducing the program data 12, and the title 50 stores therein a title of the program data 12, respectively.

There has been described an example of the clip attribute information 20 generated by the analyzing unit 150 and the recording attribute information 40 associated with the clip attribute information 20 with reference to FIG. 5. The configuration of the clip attribute information 20 and the recording attribute information 40 is not limited to the example. For example, arbitrary additional items may be provided in or unnecessary items may be omitted from the clip attribute information 20 or the recording attribute information 40.

Returning to FIG. 3 again, the description of the functions of the recording and reproducing apparatus 100 according to the present embodiment will be continued.

Since the generation of the clip attribute information 20 by the analyzing unit 150 includes an analyzing process of the contents of the program data, it typically finishes after the end of recording of the program data 12 by the recording unit 140. Thus, when the program data 12 is output from the extracting unit 130, the analyzing unit 150 preferably identifies individual clips sequentially, generates the clip attribute information 20 for each identified clip and accumulates it into an internal buffer. In such a configuration, when the recording is terminated, for example, the clip attribute information 20 accumulated in the buffer may be recorded into the recording unit 140.

Herein, a content of any CM section contained in one program data 12 may be repeated with the contents of another CM section. For example, in the program data 12 shown in FIG. 4, the content of CM1 is repeated with the clips C1, C3, C7 and C11 as CM sections. In the present embodiment, the analyzing unit 150 detects a repetition of the contents of the CM sections by comparing the contents of clip data each other to detect a similarity in video or audio or by comparing attribute values contained in the data packets, thereby.

When it is determined that a content of a CM section is a repeated one with that of another CM section, the analyzing unit 150 additionally writes the reference information 34 for referring to the other CM section whose content is repeated into the clip attribute information 20 associated with the CM section. Then, the analyzing unit 150 causes the recording unit 140 to omit the recording process for the repeating CM section. Alternatively, the clip data recorded in the recording unit 140 may be deleted after the analysis of the program data 12 by the analyzing unit 150 ends so that the recording of the CM sections may be omitted.

Figure 6:
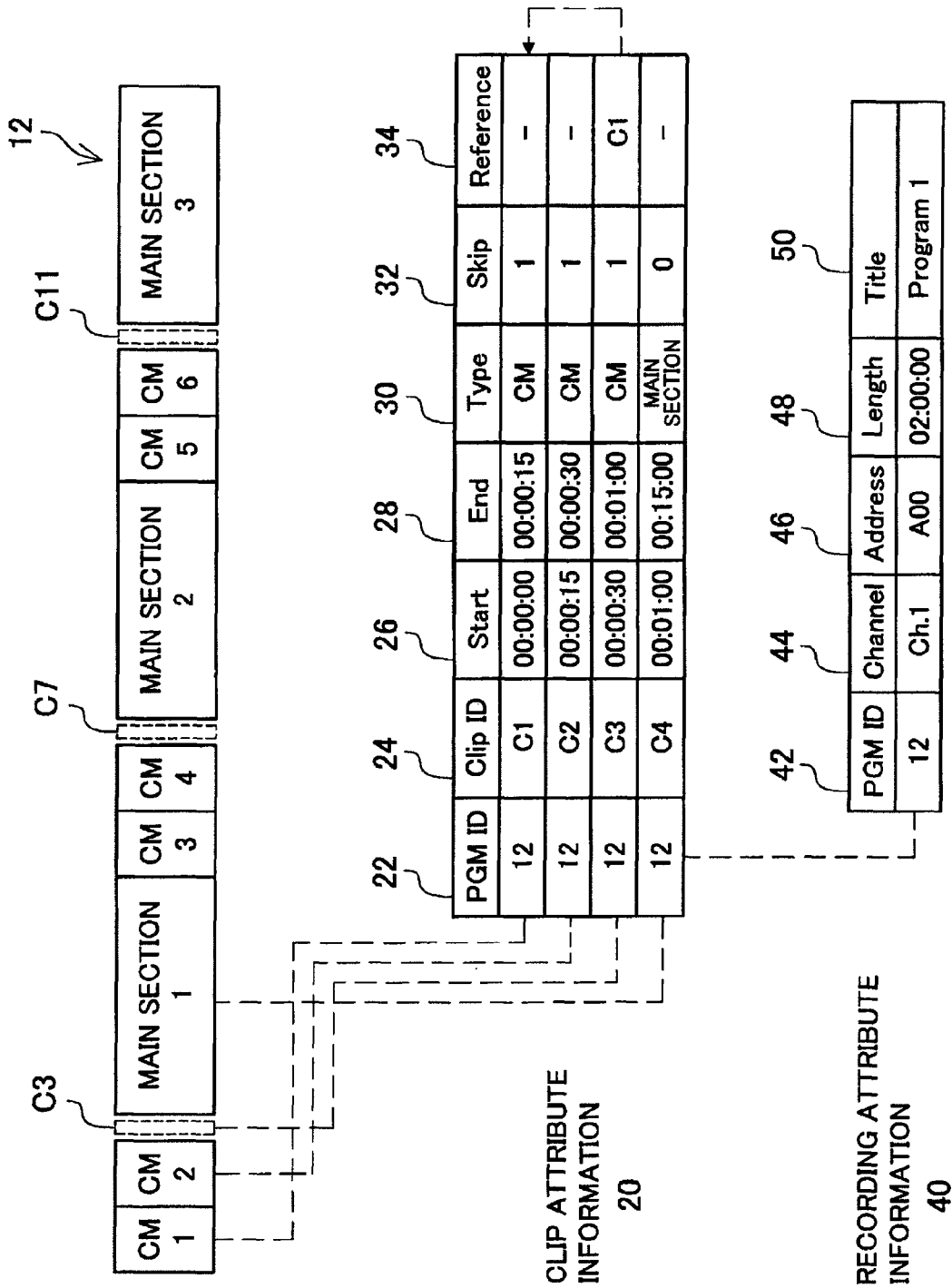
FIG. 6 is an explanatory diagram showing another example of the clip attribute information recorded in the recording unit.

FIG. 6 is an explanatory diagram showing a configuration of the program data 12, the clip attribute information 20 and the recording attribute information 40 similarly to FIG. 5. In FIG. 6, the clips C3, C7 and C11 shown in FIG. 5 are omitted from the configuration of the program data 12. The clip identifier "C1" of the clip C1 having the repeated content with the clip C3 is additionally written to the reference information 34 of the clip attribute information 20 associated with the clip C3.

The value which is additionally written to the reference information 34 in order to refer to other CM section whose contents are repeated is not limited to the clip identifier and may be alternatively a start time or start address of the clip having the repeated content. The reference information 34 is used for reproducing the clip as described later.

In FIGS. 5 and 6, the skip information 32 is shown as being added to a record of the clip attribute information 20 of all the clips, but the skip information 32 may be integrally held in any one record for the CM section whose content is repeated.

Returning to FIG. 3 again, the description of the function of the recording and reproducing apparatus 100 according to the present embodiment will be continued.

The reproduction control unit 160 starts the reproduction of the program data recorded in the recording unit 140 in response to an instruction from the viewer via the input unit 110. More specifically, when received a reproduction request signal from the viewer, the reproduction control unit 160 reads out the clip attribute information 20 and the recording attribute information 40 corresponding to the program data 12 whose reproduction has been requested from the recording unit 140. Then, the reproduction control unit 160 sequentially determines starting with the head clip of the program whether the clips are to be skipped using the clip attribute information 20, and instructs the decoding unit 180 to read out, decode and reproduce the clip data not to be skipped.

In the present embodiment, while reproduction of the program data is carried out in control of the reproduction control unit 160, the viewer can request the recording and reproducing apparatus 100 to skip a CM section being reproduced. The skip request is made by user's operation with a mouse or a keyboard, or a remote controller constituting the input device 912. When skipping is requested by the viewer, the input unit 110 generates a skip request signal and outputs it to the data processing unit 170.

After receiving the skip request signal, the data processing unit 170 decides that the CM section being reproduced by the reproduction control unit 160 at the time is the section requested to be skipped. Then, the data processing unit 170 adds skip information indicating that skipping has been requested to the clip attribute information 20 associated with the CM section requested to be skipped. For example, the data processing unit 170 may indicate that skipping of the CM section has been requested by inverting the logical value of the skip information 32 shown in FIG. 5.

With the above processing, the reproduction of the CM sections subsequently read by the reproduction control unit 160 will be skipped according to the determination of the reproduction control unit 160. In the present embodiment, the reproduction of the CM section just when the skip request signal is input is not skipped. Thus, user's at least one time viewing of the CM section is ensured.

The data processing unit 170 may further add a viewing counter indicating the number of times that a viewer viewed each commercial message section to the clip attribute information 20. In this case, the reproduction control unit 160 may skip the reproduction of CM sections of which the viewing counter exceeds a predetermined threshold value among the CM sections requested to skip. For example, if a sponsor wishes the CM to be viewed more than once, a threshold value indicating the minimum CM viewing counter may be contained in a broadcast wave or digital broadcast packet and obtained by the extracting unit 130 or the analyzing unit 150 for controlling the reproduction.

The encoding unit 180 which has been instructed to decode and reproduce the clip data by the reproduction control unit 160 refers to the start position 26 and the end position 28 of the clip, for example, obtains the clip data from the recording unit 140 and decodes it. Then, the video and audio decoded by the decoding unit 180 is output to the output unit 190.

The output unit 190 uses the output device 914 shown in FIG. 2 to output a series of videos and audios decoded by the decoding unit 180 to the viewer.

The function of the recording and reproducing apparatus 100 has been described with reference to FIGS. 3 to 6 so far. Next, a flow of a recording processing performed by the recording and reproducing apparatus 100 will be described.

[3] An Example of a Flow of Recording Processing

Figure 7:
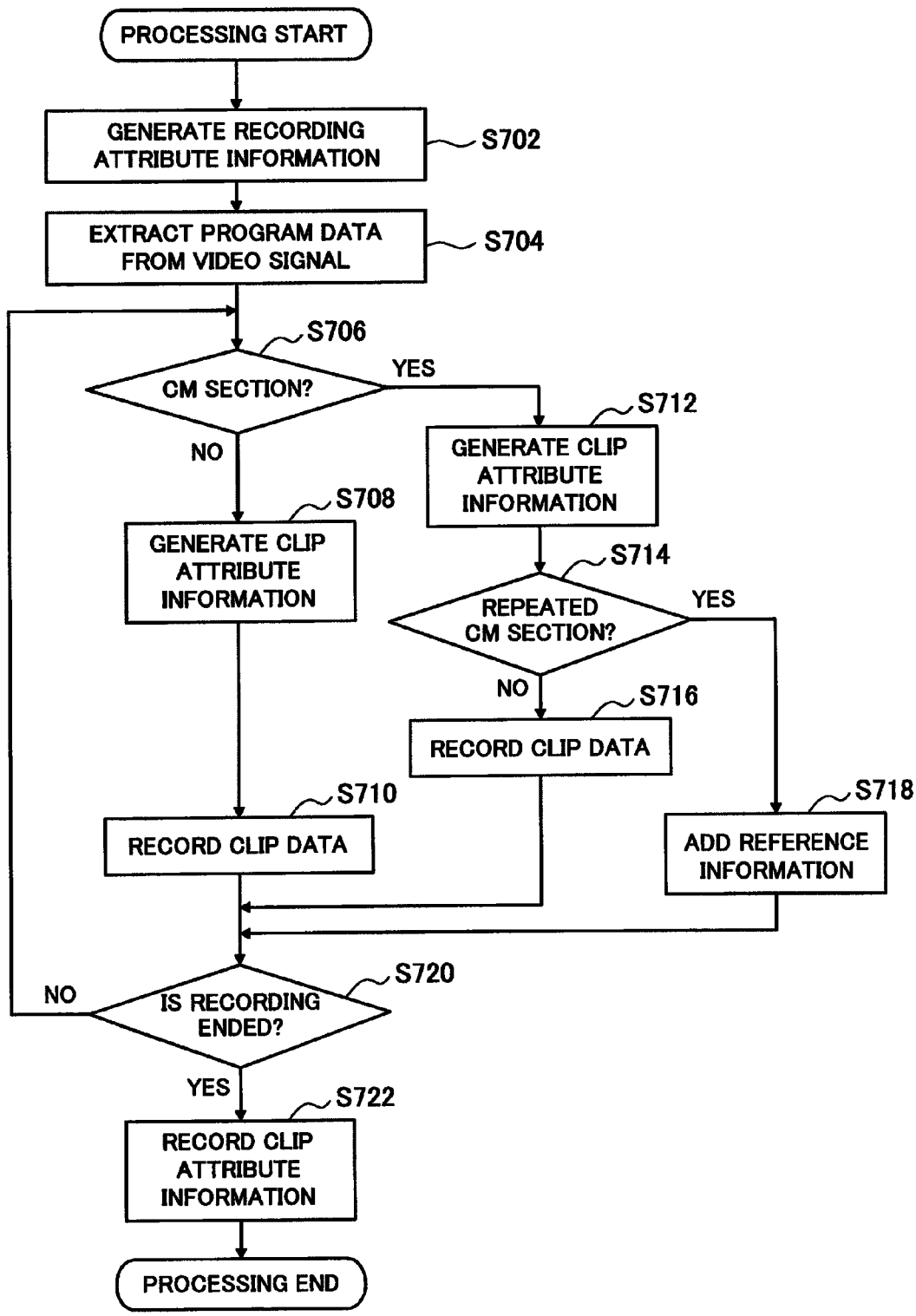
FIG. 7 is a flowchart showing a flow of a recording processing of a video data according to an embodiment.

FIG. 7 is a flowchart showing an example of a flow of a recording processing by the recording and reproducing apparatus 100 according to the present embodiment.

With reference to FIG. 7, at first, a program data recording processing is started by a request from a viewer or when a reserved time is reached. At this time, the recording attribute information 40 containing the program ID 42 or the channel 44 shown in FIG. 5 is generated (S702).

Then, the extracting unit 130 extracts the program data 12 to be recorded from a video signal received by the receiving unit 120 (S704).

The extracted program data 12 is output to the analyzing unit 150, where identification whether the clip is a CM section or a main section is performed (S706).

When the clip is identified to be a main section in S706, the analyzing unit 150 generates clip attribute information 20 in which the clip type 30 is "main section" (S708). Further, the recording unit 140 records the clip data corresponding to the main section (S710).

On the other hand, when the clip is identified to be a CM section in S706, the analyzing unit 150 generates clip attribute information 20 in which the clip type 30 is "CM" (S712).

The analyzing unit 150 further determines whether the content of the clip is repeated one of another CM section already recorded by the recording unit 140 (S714). Here, when the content is not a repeated one of another CM section, the clip data of the clip is recorded by the recording unit 140 (S716).

On the other hand, in S714, when the content of the clip is a repeated one of another CM section already recorded by the recording unit 140, reference information 34 for referring to the repeated other CM section is added to the clip attribute information 20 associated with the clip (S718). In this case, the recording unit 140 does not record the clip data of the clip.

Thereafter, it is determined whether the recording is to be ended for finishing program, a viewer's request to finish recording or arrival of the preset recording end time (S720). If the recording is not to be ended, the processing returns to S706 and the above processing is performed for the next clip. On the other hand, if the recording is to be ended, the clip attribute information 20 and the recording attribute information 40 accumulated in a buffer during the above processing are recorded by the recording unit 140 (S722).

The flow of the recording processing by the recording and reproducing apparatus 100 according to the present embodiment has been described with reference to FIG. 7. Next, a flow of a reproducing processing performed by the recording and reproducing apparatus 100 will be described.

[4] An Example of a Flow of Reproducing Processing

Figure 8:
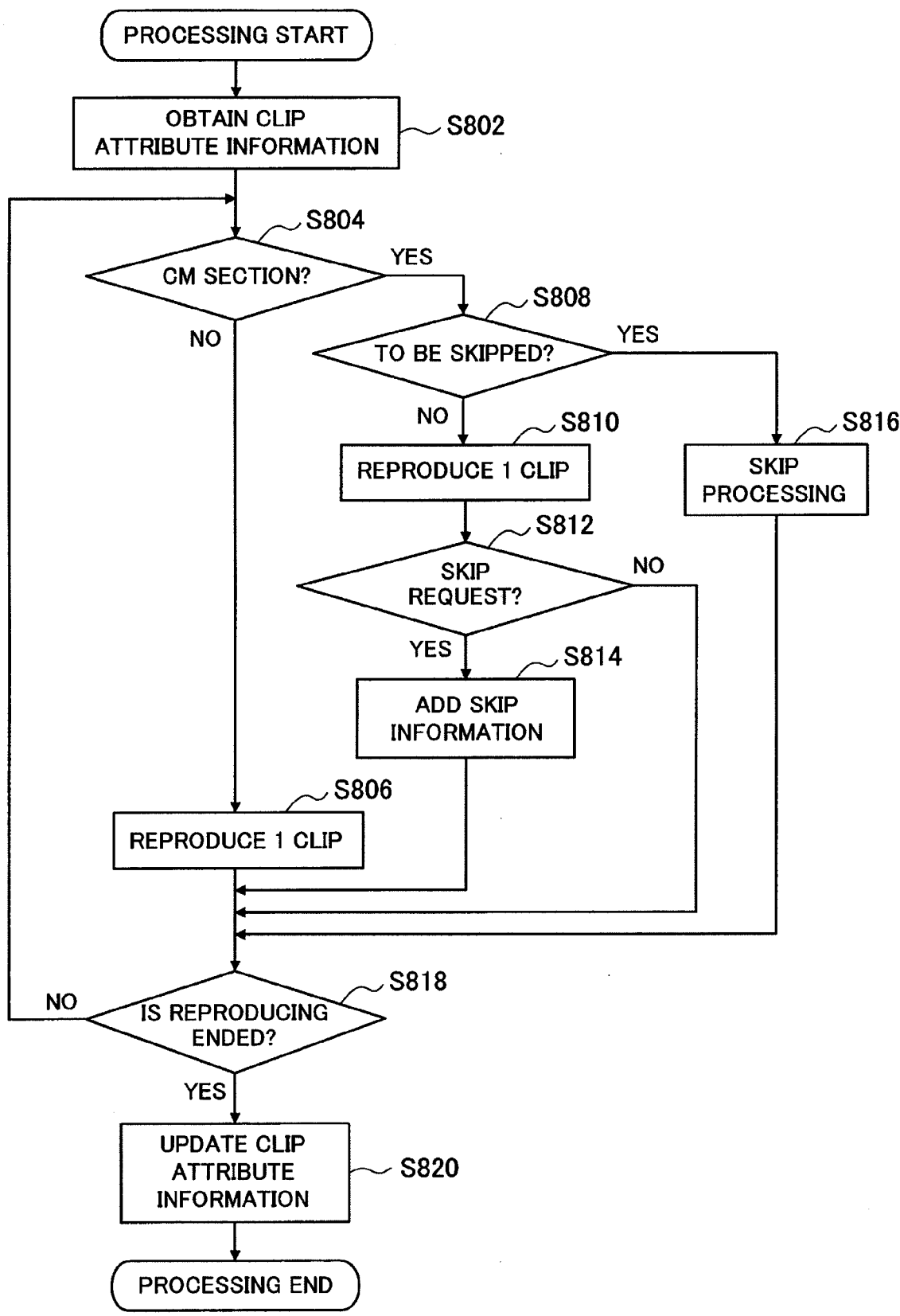
FIG. 8 is a flowchart showing a flow of a reproducing processing of a video data according to an embodiment.

FIG. 8 is a flowchart showing an example of a flow of a reproducing processing by the recording and reproducing apparatus 100 according to the present embodiment.

With reference to FIG. 8, at first, a reproducing processing is started in response to a viewer's request, and the clip attribute information 20 and the recording attribute information 40 associated with the program data 12 whose reproduction has been requested are obtained by the reproduction control unit 160 (S802).

Then, the clip type 30 of the clip attribute information 20 is used to determine whether each clip is a CM section or a main section sequentially from the clip at the reproduction start position of the program data 12 (at the head or halfway of the program data 12) (S804).

When the clip is a main section, an instruction of reproducing the clip data corresponding to the main section is given from the reproduction control unit 160 to the decoding unit 180. Then, the decoding unit 180 reads out the instructed clip data from the recording unit 140, decodes and reproduces it (S806).

On the other hand when the clip is a CM section in S804, next, the skip information 32 of the clip attribute information 20 is used to determine whether the reproduction of the CM section is to be skipped (S808). For example, when the skip information 32 indicates that skipping of the CM section is requested, it may be determined that the CM section is to be skipped. Even when skipping of the CM section is requested, if the viewing counter (or a reproduction counter) by the viewer is below a predetermined threshold value, it may be determined that the CM section is not to be skipped.

When it is determined that the reproduction of the CM section is not to be skipped in S808, an instruction of reproducing the clip data corresponding to the CM section is given from the reproduction control unit 160 to the decoding unit 180. Then, the decoding unit 180 reads out the instructed clip data from the recording unit 140, decodes and reproduces it (S810).

When the reproduction of the clip data corresponding to the CM section is instructed, if the recording of the clip data has been omitted, the reproduction control unit 160 uses the reference information 34 of the clip attribute information 20 to know where the clip data to be reproduced is stored. Thereby, the CM section can be reproduced at a position of the original program data 12.

Further, the data processing unit 170 may accept an input of a skip request signal by the viewer during the reproduction of the CM section (S812). Then, when the skip request signal has been input by the viewer, the data processing unit 170 adds skip information 32 for skipping subsequent reproduction to the clip attribute information 20 associated with the CM section being reproduced by the reproduction control unit 160 at this time (S814).

Meanwhile, when it is determined that the reproduction of the CM section is to be skipped in S808, an instruction of reproducing the clip data corresponding to the CM section is not made (S816) and the processing proceeds to S818.

Thereafter, a determination is made as to whether the reproduction is to be ended due to, for example, the end of the recorded program data or the viewer's request fir ending the reproduction (S818). When the reproduction is not to be ended, the processing returns to S804 and the above processing will be performed again for the next clip. On the other hand, when the reproduction is to be ended, the clip attribute information 20 and the recording attribute information 40, which are updated by, for example, addition of the skip information 32 and accumulated in a buffer, are recorded by the recording unit 140 (S820).

[4] At the End

The recording and reproducing apparatus 100 according to an embodiment of the present invention has been described in detail with reference to FIGS. 1 to 8. According to the present embodiment, the clip attribute information 20 is generated for CM sections and main sections identified by the analyzing unit 150 when recording the program data 12. Then, when a skip is requested by the viewer during reproduction, the data processing unit 170 adds the skip information 32 to the clip attribute information 20 associated with the CM section requested to be skipped. Thus, the reproduction control unit 160 can determine, depending on the skip information 32, whether the reproduction of the CM section is to be skipped when the CM section is subsequently reproduced.

Further, according to the present embodiment, the reproduction of the CM section which is being reproduced when a skip request signal is input is not to be skipped. Thus, the viewing of the CM section by the viewer can be ensured at least once at the same time while meeting the viewer's skip request.

Herein, the reproduction control unit 160 may skip the reproduction of the CM section of which the viewing counter or the reproduction counter exceeds a predetermined threshold value depending on the skip information 32 instead of simply skipping the reproduction of the CM section for which the skip information 32 indicates that skipping is requested. With this configuration, when the sponsor desires to broadcast the CM section more than once, such a demand is easily fulfilled.

Further, the analyzing unit 150 may determine whether the content of any CM section contained in the program data 12 is repeated one of another CM section recorded by the recording unit 140 and to cause the recording unit 140 to omit recording of the CM section which has been determined to be repeating one. In such a case, the storage area in the recording and reproducing apparatus 100 can be saved.

In that case, the analyzing unit 150 may add the reference information 34 for referring to the clip data of the repeated other CM section to the clip attribute information 20 associated with the CM section whose recording is omitted by the recording unit 140. Thus, when the recording of the CM section to be read from the recording unit 140 is omitted, the reproduction control unit 160 may use the reference information 34 to read and reproduce the clip data. With this configuration, the CM section can be reproduced at a position intended by the sponsor in the program.

In the present embodiment, the example in which the reproduction of the CM section is skipped in the subsequent reproductions based on the skip request signal input by the viewer is described. However, the reproduction counter of the CM section having the same content may be automatically recorded by the reproduction control unit 160 and the reproduction of the CM section of which the reproduction counter exceeds a predetermined threshold value may be skipped. In that case, even when the skip request signal is not input by the viewer, skipping may be automatically performed based on the reproduction counter of each CM section.

It should be understood by those skilled in the art that various modifications, combinations, sub-combinations and alterations may occur depending on design requirements and other factors insofar as they are within the scope of the appended claims or the equivalents thereof.

For example, the recording processing or reproducing processing according to an embodiment described with reference to FIG. 7 or 8 may not necessarily be performed in the order described in the flowcharts. Each processing step may contain processes performed in parallel or performed individually.

The present invention contains subject matter related to Japanese Patent Application JP 2008-174975 filed in the Japan Patent Office on Jul. 3, 2008, the entire contents of which being incorporated herein by reference.

What is claimed is:

1. A recording and reproducing apparatus comprising:
   an extracting unit that extracts program data containing commercial message sections and main sections from a video signal;
   a recording unit that records the program data extracted by the extracting unit;
   an analyzing unit that analyzes the program data to identify the commercial message sections and the main sections and generates clip attribute information for the identified commercial message sections;
   a data processing unit that adds skip information indicating that skipping is requested to the clip attribute information based on a skip request signal input by a viewer; and
   a reproduction control unit that controls the reproduction of the commercial message sections depending on the skip information when reproducing the program data recorded in the recording unit,
   wherein the reproduction control unit determines not to skip a commercial message, the skip being requested by a viewer, when the number of times that this commercial message is viewed is below a predetermined threshold value,
   wherein the reproduction control unit automatically skips the reproduction of a commercial message without a skip request signal input by a viewer after this commercial message is viewed by more than a predetermined number of times,
   wherein the clip attribute information of each commercial message sections relates identification information of the commercial message section with identification information of a main section which the commercial message section belongs to, start and end positions indicating a start time and an end time of the commercial message section in the main section, skip information indicating whether to skip the commercial message section, and a reference destination indicating a start time or a start address of another commercial message section that is a repeat of the commercial message section, and
   wherein after recording the program data, the recording unit deletes a first recorded commercial message section that is a repeat of a second commercial message section.

2. The recording and reproducing apparatus according to claim 1, wherein the reproduction control unit skips a reproduction of a commercial message section for which the skip information indicates that skipping is requested.

3. The recoding and reproducing apparatus according to claim 1, wherein the data processing unit adds a viewing counter indicating the number of times that a viewer viewed each commercial message section, and
   the reproduction control unit skips a reproduction of a commercial message section of which the viewing counter exceeds a predetermined threshold value depending on the skip information.

4. The recording and reproducing apparatus according to claim 1, wherein the reproduction control unit does not skip the reproduction of a commercial message section being reproduced when a skip request signal is input.

5. The recording and reproducing apparatus according to claim 1, wherein the data processing unit determines that the commercial message section being reproduced by the reproduction control unit when a skip request signal is input is a commercial message section requested to be skipped.

6. The recording and reproducing apparatus according to claim 1, wherein the analyzing unit determines whether a content of an arbitrary commercial message section contained in the program data is repeated one of a content of other commercial message section recorded by the recording unit, and causes the recording unit to omit the recording of the commercial message section determined to be repeated one.

7. The recording and reproducing apparatus according to claim 6, wherein the analyzing unit adds reference information for referring to the other commercial message section repeated by the commercial message section whose recording is omitted by the recording unit to the clip attribute information.

8. The recording and reproducing apparatus according to claim 7, wherein the reproduction control unit uses the reference information to read and reproduce a content of a commercial message section when the recording of the commercial message section to be read has been omitted by the recording unit.

9. A recording and reproducing method comprising the steps of:
   extracting program data containing commercial message sections and main sections from a video signal;
   recording the extracted program data therein;
   analyzing the program data to identify the commercial message sections and the main sections;
   generating dip attribute information for the identified commercial message sections;
   adding skip information indicting that skipping is requested to the clip attribute information based on a skip request signal input by a viewer; and
   controlling the reproduction of the commercial message sections depending on the skip information when reproducing the program data,
   wherein the controlling step determines not to skip a commercial message, the skip being requested by a viewer, when the number of times that this commercial message is viewed is below a predetermined threshold value,
   wherein the controlling step automatically skips the reproduction of a commercial message without a skip request signal input by a viewer after this commercial message is viewed by more than a predetermined number of times,
   wherein the clip attribute information of each commercial message sections relates identification information of the commercial message section with identification information of a main section which the commercial message section belongs to, start and end positions indicating a start time and an end time of the commercial message section in the main section, skip information indicating whether to skip the commercial message section, and a reference destination indicating a start time or a start address of another commercial message section that is a repeat of the commercial message section, and
   wherein after recording the program data, the recording step deletes a first recorded commercial message section that is a repeat of a second commercial message section.

10. A non-transitory recording medium storing a program for causing a computer controlling a recording and reproducing apparatus to function as:
   an extracting unit that extracts program data containing commercial message sections and main sections from a video signal;
   a recording unit that records the program data extracted by the extracting unit;
   an analyzing unit that analyzes the program data to identify the commercial message sections and the main sections and generates clip attribute information for the identified commercial message sections;
   a data processing unit that adds skip information indicating that skipping is requested to the clip attribute information based on a skip request signal input by a viewer; and
   a reproduction control unit that controls the reproduction or the commercial message sections depending on the skip information when reproducing the program data recorded in the recording unit,
   wherein the reproduction control unit determines not to skip a commercial message, the skip being requested by a viewer, when the number of times that this commercial message is viewed is below a predetermined threshold value,
   wherein the reproduction control unit automatically skips the reproduction of a commercial message without a skip request signal input by a viewer after this commercial message is viewed by more than a predetermined number of times,
   wherein the clip attribute information of each commercial message sections relates identification information of the commercial message section with identification information of a main section which the commercial message section belongs to, start and end positions indicating a start time and an end time of the commercial message section in the main section, skip information indicating whether to skip the commercial message section, and a reference destination indicating a start time or a start address of another commercial message section that is a repeat of the commercial message second, and
   wherein after recording the program data, the recording unit deletes a first recorded commercial message section that is a repeat of a second commercial message section.

* * * * *